United States Patent Office 3,288,886
Patented Nov. 29, 1966

3,288,886
BLEND OF VINYL CHLORIDE RESIN AND GRAFT COPOLYMER PREPARED BY CONSECUTIVE POLYMERIZATION OF MONOMERS ONTO BUTADIENE POLYMER
Shinichiro Himei, Ashiya, and Masamichi Takine and Kunio Akita, Osaka, Japan, assignors to Kanegafuchi Chemical Industry Company, Limited, Osaka, Japan, a corporation of Japan
No Drawing. Filed Jan. 15, 1964, Ser. No. 337,736
Claims priority, application Japan, Jan. 25, 1963, 38/3,685
1 Claim. (Cl. 260—876)

This invention relates to the manufacturing method of a thermal plastic synthetic resinous composition consisting of a large quantity of hard vinyl chloride polymers, on one hand, and a small quantity of graft polymers, in which styrene and methyl-methacrylate are polymerized on rubber-shaped butadiene polymer series under specific conditions, this being intended for improving its impact resistance, which is a drawback, while retaining advantages of a hard vinyl chloride polymer.

The hard vinyl chloride polymer is used as a substitute for other metals, as a suitable corrosion-resistant industrial material. It, however, had the disadvantage that its impact resistance is relatively low. Researches for the purpose of eliminating this disadvantage has so far been made public variously, in Letters Patent and other literature. The present inventor, likewise, was engaged in similar research work, which has now culminated in the present invention.

The graft polymer of the styrene-methylmethacrylate of the rubber-shaped butadiene polymer series, which this invention relates, is manufactured by, first, graft-polymerizing styrene on the ruber-shaped butadiene polymer series, and, after completion of said polymerization, by grafting methylmethacrylate in a quantity (in weight: the same applies hereinafter) less than that of styrene previously used. The rubber-shaped butadiene polymer series used contains a polybutadiene and/or butadiene-styrene copolymer.

The styrene polymer and rubber-shaped butadiene polymer series has a low co-solubility with the vinyl chloride polymer, and, accordingly, each of their single units or their mixtures with a vinyl chloride polymer fails to have any improved impact resistance. The graft polymer, obtained by graft-polymerizing styrene on a rubber-shaped butadiene polymer series, also, has the similar nature.

On the other hand, it is known that a methylmethacrylate polymer has a high solubility with a vinyl chloride polymer, and the attempt to improve the impact resistance by mixing the graft polymer obtained by graft-polymerizing methylmethacrylate on a rubber-shaped butadiene polymer series, is already well known by the Japanese Patent Bulletins 8136–1959, 3534–1960, etc.

Thus, another method may be conceived—namely, instead of graft polymerizing styrene on a rubber-shaped butadiene polymer series, part of styrene is replaced by methylmethacrylate and, thus, a mixed polymer of styrene and methylmethacrylate is graft-polymerized. As a result, it was known, however, that, within the range of composition of said mixed monomer, containing styrene in a quantity larger than methylmethacrylate, the impact resistance of the product obtained by mixing a simple graft polymer, thus produced, with a vinyl chloride polymer, shows no improvement whatever, or only a negligible improvement, if any, and, thus, it carries practically no value.

Styrene, on the other hand, has the advantages that, the more its percentage occupied in the graft polymer, the cheaper it will be as a raw material, and, besides, that the fluidity and thermal colored resistance at the processing temperature of the composition of the graft polymer and vinyl chloride polymer will be improved.

This invention provides a novel manufacturing method, by which the impact resistance of a vinyl chloride polymer may be improved without imparing these advantages.

The method may be carried out, first, by graft-polymerizing styrene on a rubber-shaped butadiene polymer series, and, after a thorough polymerization up to the point where the styrene monomer may not be substantially recognized, methylmethacrylate is added for a second-step graft-polymerization.

Accordingly, a copolymer chain of styrene-methylmethacrylate is not substantially recognized in the graft polymer thus produced.

The fact that a surprising improvement of the impact resistance is seen when the graft polymer obtained is mixed with the vinyl chloride polymer, is a complete departure from the conventional conception that, even in case styrene, having a low-co-stability with vinyl chloride polymers, is not used alone but used as one of the graft-polymerizing components of the rubber-shaped butadiene polymer series, in order to ameliorate as far as possible the effect of styrene to deteriorate the co-solubility, it should be used only in mixing with a methylmethacrylate monomer, having a better co-solubility.

According to the manufacturing method of this invention, it is apparent that a styrene mono-polymer chain is produced in the graft polymer. That this kind of graft polymer will have a remarkably improved impact resistance in comparison with a graft polymer produced in such a well-known way that no styrene mono-polymer chain may be produced, has never so far been conceived, and, as such, should be termed a perfectly new discovery.

The rubber-shaped butadiene polymer series used in this invention is manufactured by emulsifying and polymerizing the mixture of butadiene or butadiene and styrene by the known art. In the case of a butadiene-styrene polymer, it is necessary to contain more than 50% (in weight) of butadiene in the molecules thereof. If the percentage is below 50%, the rubber property is decreased, making it impossible to have the effect of this invention fully displayed.

The ratio of styrene and methylmethacrylate should be 50~90%, or preferably 55~75% for the former, and 50~10%, or preferably 45~25% for the latter. In case the percentage for styrene is below 50%, no marked effect in the improvement of the impact resistance will result while the fluidity and thermal colored resistance at the processing temperature of the composition of this invention will be deteriorated, and, again, in case it is above 90%, a composition having the effect of improving the impact resistance will be hardly obtained.

The ratio of the rubber-shaped butadiene polymer series and the total monomer component used in graft polymerization should be 10~70 parts or preferably 30~50 parts for the former, and 90~30 parts or preferably 70~50 parts for the latter. In case the percentage of the rubber-shaped butadiene polymer series is below 10 parts, little effect of improving the impact resistance is obtained, while, in case it is above 70 parts, inferior co-solubility with the vinyl chloride polymer will result, and, thus, in either case, the object of this invention may not be achieved. An appropriate graft polymerization is carried out in the following procedure.

A rubber-shaped butadiene polymer latex is placed in the polymerizing machine, and, after the addition of an appropriate amount of water, a catalyst, a polymerization modifier and an emulsifier, the machine is tightly closed and the air inside is thoroughly drained out, and, then, styrene is added, the temperature is raised to the appropriate level, and, thus, polymerization is started. After completion of the polymerization of styrene, methylmethacrylate is added, and, if necessary, a catalyst is added for the completion of polymerization. In case the rubber-shaped butadiene polymer series latex is not entirely exposed to the air, polymerization may at times be carried out without using a catalyst. If the catalyst is soluble in oil, it may be dissolved in styrene or methylmethacrylate. At times, again, any polymerization modifier is not used, and, if necessary, it may be used, dissolved or un-dissolved in a monomer. As for the emulsifier, no emulsifier should preferably be used except what is already in existence in the rubber-shaped butadiene polymer series latex. The two-step graft polymer latex thus obtained, after the addition of a suitable age resistor or stabilizer, is neutralized by a mineral acid and coagulated by adding an inorganic electrolysis. After heat treatment, it is dehydrated, rinsed and dried.

The composition of this invention should contain 70~95 parts or preferably 80~90 parts of the hard vinyl chloride polymer, and 30~5 parts or preferably 20~10 parts of the graft polymer. In case the latter is above 30 parts, the impact resistance is deteriorated, and, in case it is below 5 parts, little effect of improving the impact resistance results. The effect of improving the impact resistance becomes the greatest when the latter is kept within the range of 20~10 parts.

The intended composition may be obtained by uniformly mixing a hard vinyl chloride polymer series and graft polymer by means of a rubber mill, Banbury mixer, extruder, etc. Or else, the method of coagulating the resin after the latices of the two polymers are mixed may be followed.

The hard vinyl chloride polymer may use not only a vinyl chloride mono-polymer but also such copolymers, capable of polymerization with vinyl chloride, as vinyl chloride-ethylene, vinylacetate, vinylidene chloride, acrylonitril, vinyl, ether, acrylic ester, methacrylic ester, etc. It is necessary that more than 80% at least of vinyl chloride is contained in the molecules at the time of copolymerization.

The intended composition is processed into the shape of a sheet or pipe with or without the addition of a stabilizer, lubricant, filler or coloring agent by the processes of extrusion, emission, calender processing or blow molding. In these processes, use of the stabilizer conventionally used for vinyl chloride polymers is found effective; however, in view of the purpose of this invention, use of a solid stabilizer is desirable. If needed, again, use of a small amount of a plastic is not objectionable.

Below, the invention will be described by an embodiment.

(Embodiment)

1. MANUFACTURING CONDITION OF POLYMERS

A. *Hard vinyl chloride polymer*

A resin of 1300 in average polymerization degree, obtained by the known method of suspension polymerization.

B. *Rubber-shaped butadiene polymer series latex*

The polymerizing conditions are:

| | Parts |
|---|---|
| A mixture of butadiene-1,3 or butadiene and styrene | 100 |
| Water | 150 |
| Sodium lauryl sulphalic ester | 30 |
| Potassium persulphate | 0.25 |
| Dodecyl mercaptan | 0.15 |

When it was heated at 60° C. for 24 hours, 62% of polymerization rate was reached. Subsequently, it was drained of the air in vacuum, and, as a result, a stable latex was obtained. This latex may be classified as follows depending on the kind and the ratios of ingredients of the monomer:

| Names of B latex | Butadiene (percent) | Styrene (percent) |
|---|---|---|
| SBR | 75 | 25 |
| BR | 100 | 0 |

C. *2-step graft polymer latex*

The polymerizing conditions are:

| | Parts |
|---|---|
| B latex | X |
| Monomer $V_1$ for first-step graft polymerization | $y_1$ |
| Water | 150 |
| Cumene hydroperoxide | 0.3 |
| Sodium sulphoxylate formaldehyde | 0.15 |

After heating at 60° C. for 4 hours, the polymerization rate of 99% was obtained. Subsequently:

| | Parts |
|---|---|
| Monomer $V_2$ for second-step graft polymerization | $y_2$ | was added, and polymerized for another 4 hours, and the rate of polymerization against all of the monomers added was set above 97%.

Note:
 (1) X indicates the number of parts of the polymer contained (the same applies hereinafter).
 (2) $X+y_1+y_2=100$ D. *Simple graft polymer latex*

The polymerizing conditions are:

| | Parts |
|---|---|
| B latex | X |
| Monomer $V_0$ for graft polymerization | $y_0$ |
| Water | 150 |
| Cumene hydroperoxide | 0.3 |
| Sodium sulphoxylate formaldehyde | 0.15 |

After heating at 60° C. for 4 hours, the rate of polymerization attained was above 98%.

Note: $X+y_0 \leq 100$

E. *Vinyl polymer latex*

The polymerizing conditions:

| | Parts |
|---|---|
| Vinyl monomer | 100 |
| Water | 150 |
| Sodium lauryl sulphalic ester | 3.0 |
| Cumene hydroperoxide | 0.3 |
| Sodium sulphoxylate formaldehyde | 0.15 |

After heating at 60° C. for 4 hours, the rate of polymerization attained was above 98%.

2. POLYMERIZATION COMPOSITION OF POLYMERS AND COMPOSITION OF COMPOSITES

| Polymer mixed composition | Vinyl chloride polymer | Rubber-shaped butadiene polymer series | | 2-step graft polymer | | Simple graft polymer | | Vinyl polymer | |
|---|---|---|---|---|---|---|---|---|---|
| No. | Parts | Kinds | Parts | Kinds $B(x) \leftarrow V_1(y_1) \leftarrow V_2(y_2)$ | Parts | Kinds $B(x) \leftarrow V_0(y_0)$ | Parts | Kinds | Parts |
| $P_0$ | 100 | | | | | | | | |
| $P_1$ | 90 | SBR | 4 | | | | | PS+PM | 4+2 |
| $P_2$ | 90 | SBR | 4 | | | | | P(S−M) (40−20) | 6 |
| $P_3$ | 90 | | | | | SBR(40)←S(60) | 10 | | |
| $P_4$ | 90 | | | | | SBR(40)←S(40) | 8 | PM | 2 |
| $P_5$ | 90 | | | | | SBR(40)←M(20) | 6 | PS | 4 |
| $P_6$ | 90 | | | | | SBR(40)←(S+M)(40+20) | 10 | | |
| $P_7$ | 90 | | | | | (SBR(40)←M(60)) | 10 | | |
| $P_8$ | 95 | | | SBR(40)←S(40)←M(20) | 5 | | | | |
| $P_9$ | 90 | | | do | 10 | | | | |
| $P_{10}$ | 80 | | | do | 20 | | | | |
| $P_{11}$ | 70 | | | do | 30 | | | | |
| $P_{12}$ | 90 | | | | | SBR(26.7)←S(40) | 6.67 + | | |
| | | | | | | SBR(13.3)←M(20) | 3.33 | | |
| $P_{13}$ | 90 | | | SBR(40)←S(33)←M(27) | 10 | | | | |
| $P_{14}$ | 90 | | | SBR(40)←S(20)←M(40) | 10 | | | | |
| $P_{15}$ | 90 | | | SBR(50)←S(40)←M(10) | 10 | | | | |
| $P_{16}$ | 90 | | | BR(40)←S(40)←M(20) | 10 | | | | |
| $P_{17}$ | 90 | | | BR(30)←S(50)←M(20) | 10 | | | | |

NOTES:
B(x) = Kinds of rubber-shaped butadiene polymer series (number of parts at the time of polymerization).
$V_1(y_1)$ = Kind of monomers for first-step polymerization in 2-step graft polymerization (number of parts at the time of polymerization).
$V_2(y_2)$ = Kind of monomers for 2nd-step polymerization in 2-step graft polymerization (number of parts at the time of polymerization).
$V_0(y_0)$ = Kind of monomers for polymerization in simple graft polymerization (number of parts at the time of polymerization).
SBR = Butadiene-Styrene (75–25) Copolymer.
BR = Butadiene polymer.

S = Styrene monomer.
M = Methylmethacrylate monomer.
S+M = Mixture of styrene monomer and methylmethacrylate monomer.
PS = Styrene monomer.
PM = Methylmethacrylate polymer.
PS+PM = Mixture of styrene polymer and methylmethacrylate polymer.
P(S−M) = Styrene-methylmethacrylate copolymer.
← = Graft polymerization.

3. MEASURING CONDITIONS OF IMPACT STRENGTH AND OTHER PHYSICAL PROPERTIES

Of each of the latices B~E manufactured by the process 1, C and D latices were added with 0.5 part of Ionol (Shell Co.), an age modifier after it was emulsified, while simple latices or mixed latices having a mixed composition as shown in 3 were dried through the processes of coagulation, heat treatment, filtering and rinsing. These simple or mixed polymers not containing vinyl chloride polymers are hereinafter referred to as rubber compositions.

The mixture, 100 parts, of the vinyl chloride polymer and rubber composition, with the addition of Adbustab T360, 2 parts (Carlyle Chemical Co.), a stabilizer of powdered organic zinc mercaptide series and butyl-stearate, 1 part, was roll-kneaded for 10 minutes at 160° C., and the sheet, thus obtained, was pressed for 30 minutes at 170° C. in a metal pattern, and, thus, a test specimen was prepared. The impact strength (with a notch; measuring temperature 25° C.) of this test specimen was measured by the Izod test method (ASTM D–256–54T). Moreover, for obtaining referential data, the hot fluidity of the mixed polymer composite was observed by the Koka-type flow tester, and the coloring property and transparency of a press plate, 3 mm. in thickness, were examined macroscopically.

The measuring conditions by means of the flow tester were:

Measuring apparatus ___ Koka type flow tester (B method), manufactured by Shimzau.
Plunger pressure _____ 150 kg./cm.$^2$.
Nozzle size _____ 1 mm$\phi$ x 10 mm.
Measuring temperature _ 190° C.
Time of pre-heating ____ 10 minutes.
Flow unit _____ cm.$^3$/sec.

4. COMPARISON OF IMPACT STRENGTHS AND OTHER PHYSICAL PROPERTIES OF COMPOSITES (1) Comparison of varying impact strengths of rubber compositions resulting from the difference in the manufacturing methods, in case the proportions of the rubber-shaped butadiene polymer series component, the styrene component and the methyl-methacrylate component are equal.

Common conditions:
(1) Kinds of rubber-shaped butadiene polymer series _____ SBR.
(2) Rubber-shaped butadiene polymer series component:styrene components:methylmethacrylate component _____ 40:40:20 (parts).
(3) Number of parts of rubber component in compositions, 100 parts _____ 10 parts.

| Composition No. | Manufacturing Methods of Rubber Compositions | Izod Impact Strength (Kg. cm./cm.$^2$) |
|---|---|---|
| $P_1$ | Blend of PS and PM to SBR | 4.1 |
| $P_2$ | Blend of P(S−M) to SBR | 7.3 |
| $P_4$ | Blend of SBR←S graft and PM | 6.3 |
| $P_5$ | Blend of SBR←M graft and PS | 5.2 |
| $P_6$ | SBR←(S+M) graft | 9.5 |
| $P_9$ | SBR←S←M 2-step graft | 60 |
| $P_{12}$ | SBR←S graft and SBR←M graft | 9.0 |
| $P_0$* | | 2.8 |

*In case the vinyl chloride polymer exists alone. Given here for comparison.

$P_9$ produced by the method of this invention, compared with the compositions manufactured by other methods, is provided with a far greater impact strength. Especially, the difference between $P_6$ and $P_{12}$ deserves notice.

(2) Comparison of impact strengths, hot fluidities and coloring properties due to the difference in proportions of the styrene and methylmethacrylate contents contained in the 2-step graft polymer used for the manufacture of the compositions of this invention.

Common conditions:
(1) Kinds of rubber-shaped butadiene polymer series _____ SBR.
(2) Rubber-shaped butadiene polymer series content: styrene content and methylmethacrylate content, single or combined _____ 40:60 (parts).
(3) Number of parts of rubber in the composition _____ 10 parts.

| Polymer Mixed Compositions No. | Manufacturing method of rubber composites | Styrene/methylmethacrylate, percent | Hot fluidity (190° C.)×10⁻³ cm.³/sec. | Coloring property (Press plate) | Izod impact strength, Kg. cm./cm.² |
|---|---|---|---|---|---|
| P₃ | SBR←S graft | 100/0 | 2.45 | (2) Light yellow | 3.6 |
| P₉ | SBR←S←M 2-step graft | 66.7/33.3 | 1.82 | (3) Light yellow | <60 |
| P₁₃ | ___do___ | 55/45 | 1.46 | (4) Light yellow | <60 |
| P₁₄ | ___do___ | 33.3/66.7 | 1.11 | (5) Light yellow | 15.7 |
| P₇ | SBR←M graft | 0/100 | 0.85 | (6) Yellow | 13.8 |
| P₆* | | | 0.54 | (1) Colorless | 2.8 |

*This shows the case of the vinyl chloride polymer existing alone. Given here for comparison.
NOTE: The order of ranking in the coloring property indicates that the yellow coloring deepens as the numerical value increases.

The hot fluidity and thermal colored resistance are shown to improve with the mounting quantity of styrene. The impact strength shows the highest value in the range of the composition of this invention.

(3) Comparison of impact strengths by the proportions of rubber component contained in the compositions of this invention.

Common conditions:
(1) Kinds of rubber-shaped butadiene polymer series _____ SBR.
(2) Rubber-shaped butadiene polymer series conent: styrene content : methylmethacrylate content _____ 40:40:20 (parts).

| Compositions No. | Manufacturing methods of rubber composites | Number of parts of rubber composites in 100 parts of composite | Izod impact strength (kg. cm./cm.²) |
|---|---|---|---|
| P₈ | SBR←S←M 2-step graft | 5 | 17.6 |
| P₉ | ___do___ | 10 | <60 |
| P₁₀ | ___do___ | 20 | <60 |
| P₁₁ | ___do___ | 30 | 25.8 |

(4) Comparison of impact strengths varying due to the kinds and the number of parts at the time of polymerization of rubber-shaped butadiene polymers used in the manufacture of the compositions of this invention.

Common conditions:
(1) Number of parts of rubber component in 100 parts of the composition _____ 10 parts.
(2) Manufacturing method of rubber composition _____ B←S←M 2-step polymerization method.

| Compositions No. | Rubber-shaped butadiene polymer | Number of parts at B←S←M polymerization | Izod impact strength (kg.cm./cm.²) |
|---|---|---|---|
| P₉ | SBR | 40←40←20 | <60 |
| P₁₅ | SBR | 50←40←10 | <60 |
| P₁₆ | BR | 40←40←20 | <60 |
| P₁₇ | BR | 30←50←20 | <60 |

Both in the cases of SBR and BR, the impact strength shows as high a value as more than 60 within the range of composition of this invention.

The term "graft polymer" used in connection with this invention means a polymer obtained by polymerizing styrene in a rubber-shaped butadiene polymer series dispersed in water, and, then, polymerizing methylmethacrylate, but does never signify a polymer in which all of styrene and methylmethacrylate have a graft bond on the rubber-shaped butadiene polymer series.

We claim:

A composition consisting essentially of (A) 70 to 95 parts by weight of a resin selected from the group consisting of vinyl chloride homopolymers and copolymers of at least 80% by weight vinyl chloride and up to 20% by weight of a monoethylenically unsaturated compound copolymerizable therewith, and (B) 30 to 5 parts by weight of a graft copolymer of (1) 10 to 70 parts by weight of a rubbery polymer selected from the group consisting of butadiene homopolymers and copolymers of at least 50% butadiene and up to 50% styrene and (2) 90 to 30 parts by weight of monomers consisting of 50 to 90% by weight styrene and 10 to 50% by weight methyl methacrylate, said graft copolymer being prepared by first completely polymerizing styrene in the presence of an aqueous dispersion of the rubbery polymer, adding the methyl methacrylate to the reaction mixture, and polymerizing said methyl methacrylate.

References Cited by the Examiner

UNITED STATES PATENTS 3,085,082  4/1963  Baer et al. _____ 260—876 XR

FOREIGN PATENTS 850,487  10/1960  Great Britain.

MURRAY TILLMAN, *Primary Examiner.*

G. F. LESMES, *Assistant Examiner.*